United States Patent [19]

Wagner

[11] Patent Number: 4,668,006
[45] Date of Patent: May 26, 1987

[54] BOOT ASSEMBLY FOR VEHICLE CONVERTIBLE TOP

[75] Inventor: John J. Wagner, Howell, Mich.

[73] Assignee: Cars & Concepts, Inc., Brighton, Mich.

[21] Appl. No.: 790,432

[22] Filed: Oct. 23, 1985

[51] Int. Cl.⁴ .............................................. B60J 7/20
[52] U.S. Cl. ................................................. 296/136
[58] Field of Search ................... 296/136; 150/52 K; 160/354, 368 S

[56] References Cited

U.S. PATENT DOCUMENTS

| | | | |
|---|---|---|---|
| 2,664,309 | 12/1953 | Kavalar | 296/136 |
| 2,992,042 | 7/1961 | Gilson et al. | 296/136 |
| 3,237,982 | 3/1966 | Bell et al. | 296/136 |
| 3,510,165 | 5/1970 | Adams | 296/136 |
| 4,512,606 | 4/1985 | Trostle et al. | 296/136 |

FOREIGN PATENT DOCUMENTS 45-31207  12/1970  Japan .................... 150/52 K

Primary Examiner—Randolph A. Reese
Assistant Examiner—Carol L. Olson
Attorney, Agent, or Firm—Brooks & Kushman

[57] ABSTRACT

A boot assembly (28) for covering a stored vehicle convertible top includes a boot (30) of flexible material having an inner edge (32) with detachable fasteners (34) and having an outer edge (40) to which a U-shaped rod (38) of the boot assembly is secured. This U-shaped rod (38) of the boot assembly (28) provides outward loading that cooperates with the detachable fasteners in securing the boot (30) over the stored convertible top while also permitting convenient storage by detaching and bending the U shape of the boot assembly to an enclosed shape. Latch members (46) on the ends of rod (38) and latch retainers (48) on the vehicle cooperate with the detachable fasteners and the outward loading in securing the boot assembly to the vehicle. A storage bag (50) is also preferably provided for storing the boot assembly in its enclosed shape after removal from the vehicle.

5 Claims, 6 Drawing Figures

BOOT ASSEMBLY FOR VEHICLE CONVERTIBLE TOP

TECHNICAL FIELD

This invention relates to a boot assembly for covering a vehicle convertible top with the convertible top stored in a folded storage position within a U-shaped storage well of the associated vehicle.

BACKGROUND ART

Vehicle convertible tops are conventionally stored in a U-shaped storage well of the associated vehicle and covered by a boot of flexible material to provide the vehicle with an aesthetically appealing apearance. The most common way of securing the boot to the vehicle is by use of detachable connectors such as cooperable snaps on the inner and outer edges of the boot and on the vehicle around the storage well. However, such snaps do not permit quick securement and removal of the boot when the snapping or unsnapping thereof must be performed around the entire inner and outer edges of the U-shaped boot.

DISCLOSURE OF INVENTION

An object of the present invention is to provide an improved boot assembly for a vehicle convertible top and having a construction that is easily attached and removed from the associated vehicle as well as being compactly stored when removed.

In carrying out the above object and other objects of the invention, the boot assembly of the invention is utilized to cover a vehicle convertible top with the convertible top stored in a folded storage position within the U-shaped storage well of the associated vehicle. The boot assembly includes a U-shaped boot of flexible material such as cloth with a vinyl or other waterproof covering. The boot has an inner edge that extends around the inboard side of the U-shaped storage well of the vehicle and detachable fasteners secure the inner edge of the boot to the vehicle around the inboard side of the storage well. The boot also has an outer edge that extends around the outboard side of the storage well. A U-shaped rod of the boot assembly is secured to the outer edge of the boot so as to be received within the storage well outboard from the stored convertible top to provide outward loading that cooperates with the detachable fasteners in securing the boot over the stored convertible top. The U-shaped rod also permits and boot assembly to be detached and compactly stored by bending of the U shape thereof to an enclosed shape with the ends of the rod adjacent each other.

In the preferred construction of the boot assembly, the U-shaped rod includes ends having latch members. In addition, latch retainers are provided on the vehicle at the forward extremities of the storage well to releasably secure the latch members on the rod ends and cooperate with the detachable fasteners and the outward loading in securing the boot assembly to the vehicle.

A storage bag of the boot assembly is also preferably provided to receive and store the boot assembly after removal from the vehicle. After the removal from the vehicle, the boot assembly is bent to an enclosed shape where the ends of the rod are located adjacent each other. The bent boot assembly can then be inserted into the bag and compactly store. Removal of the stored boot assembly from the bag and unbending thereof from the enclosed shape back to the U shape then permits the next use of the boot assembly by securement to the vehicle storage well over the convertible top with the outward loading cooperating with the detachable fasteners and the latch members and retainers to secure the boot assembly.

The objects, features, and advantages of the present invention are readily apparent from the following detailed description of the best mode for carrying out the invention when taken in connection with the accompanying drawings.

BEST MODE FOR CARRYING OUT THE INVENTION

Figure 1:
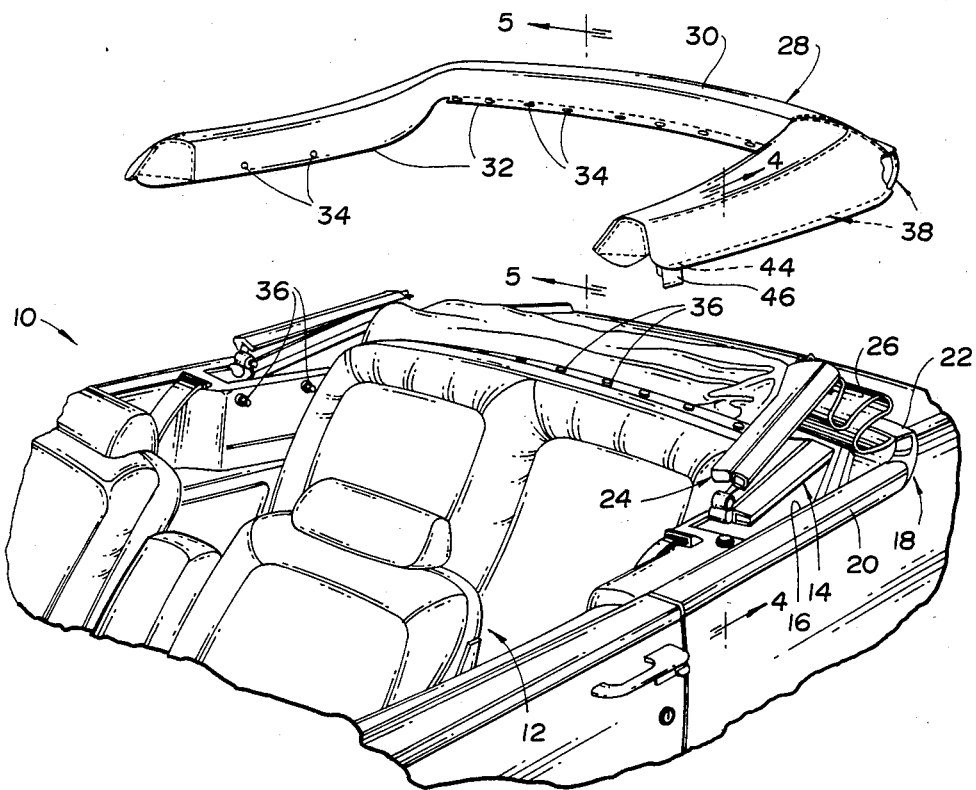
FIG. 1 is a perspective view of a vehicle convertible top and a boot assembly constructed in accordance with the present invention for use in covering the convertible top.

With reference to FIG. 1 of the drawings, a vehicle generally indicated by 10 includes an occupant compartment 12 that is selectively closed and opened by a convertible top 14 that is illustrated in a folded storage position. A storage well 16 of the vehicle 10 has a forwardly opening U shape that receives the folded convertible top 14 in the storage position in a conventional manner. The outboard extremity of the storage well 16 is defined by a reveal molding 18 having side portions 20 and a rear portion 22 that extends between the side portions to define a forwardly opening U shape. In the raised position of the convertible top 14, a foldable frame 24 thereof projects upwardly and forwardly from the storage well 16 and positions a cloth top 26 over the occupant compartment 12 in a conventional manner.

A boot assembly 28 constructed in accordance with the present invention is utlized to cover the stored convertible top 14 and provide the vehicle with an aesthetically appealing appearance with the occupant compartment 12 open as illustrated. The boot assembly 28 includes a U-shaped boot 30 of flexible material such as cloth that is covered with vinyl or another suitable waterproof coating. The boot has an inner edge 32 that extends around the inboard side of the U-shaped storage well 16 of that vehicle. Detachable fasteners 34 that are preferably embodied by snaps on the inner edge of the boot are secured to cooperable fasteners 36 embodied by snaps on the vehicle inboard from the storage well 16 to secure the boot over the folded convertible top 14.

Figure 2:
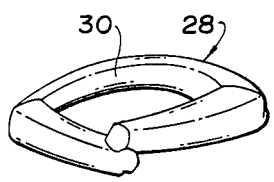
FIG. 2 is a perspective view illustrating the boot assembly bent to an enclosed shape for storage.
Figure 4:
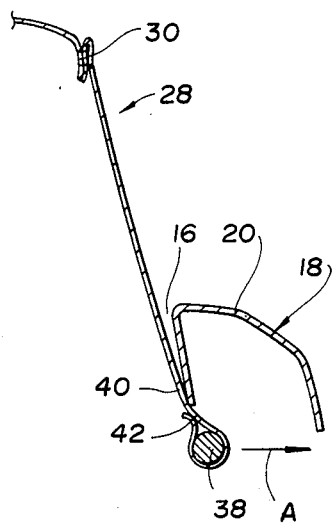
FIG. 4 is a sectional view taken at the side of the storage well along the direction of line 4—4 in FIG. 1 to illustrate the manner in which a U-shaped rod of the boot assembly outwardly loads the boot when secured to the vehicle covering the convertible top.
Figure 5:
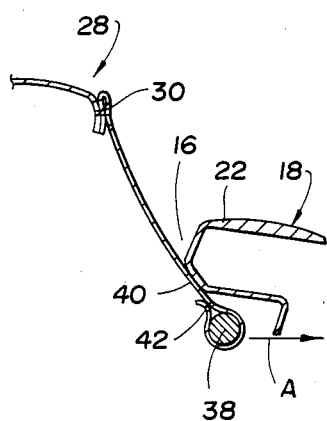
FIG. 5 is a sectional view taken at the rear of the storage well along the direction of line 5—5 in FIG. 1 to further illustrate the manner in which the U-shaped rod of the boot assembly outwardly loads the boot when secured to the vehicle covering the convertible top.

As best illustrated by combined reference to FIGS. 1, 4, and 5, the boot assembly 28 also includes a U-shaped rod 38 made of spring steel or another flexible material. This U-shaped rod 38 is secured to an outer edge 40 of the boot 30 preferably by stitching 42 that defines an edge pocket through which the rod is inserted. Upon securement of the boot assembly 28 to the vehicle. the U-shaped rod 38 is received within the storage well 16 outboard from the stored convertible top and provides an outward loading as best illustrated by arrows A in FIGS. 4 and 5. This outward loading engages the outer edge 40 of boot 30 with the reveal molding 18 at the side and rear portions 20 and 22 thereof to cooperate with the detachable fasteners 34 on the inner edge in securing the boot over the stored convertible top. As is hereinafter more fully described, the boot assembly 28 is removable and can be compactly stored by bending of the U shape thereof to an enclosed shape as illustrated in FIG. 2.

Figure 6:
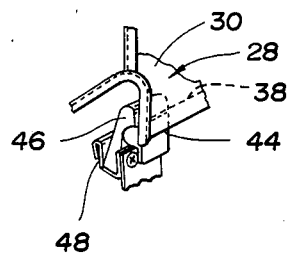
FIG. 6 is a perspective view illustrating a latch member and latch retainer for securing each end of the U-shaped rod of the boot assembly to the vehicle.

With reference to FIG. 6, the U-shaped rod 38 includes a pair of ends 44 each of which includes an associated latch member 46 of any suitable construction. Latch retainers 48 mounted on the vehicle at the forward extremities of the storage well are also provided and releasably secure the associated latch members 46 on the rod ends to cooperate with the detachable fasteners and the outward loading in securing the boot assembly to the vehicle.

Removal of the attached boot assembly 28 is accomplished by first detaching the fasteners 34 at the inner edge of boot 30 and releasing the latch members 46 on the rod ends 44. The U-shape rod 38 of boot assembly 28 is then bent inwardly to permit removal thereof from the vehicle storage well 16.

Figure 3:
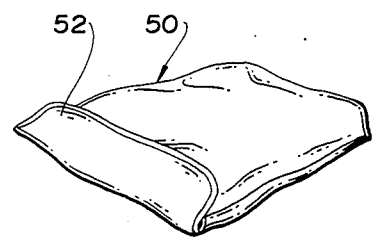
FIG. 3 is a perspective view of a bag in which the bent boot assembly is stored.

With reference to FIG. 3, the boot assembly also preferably includes a storage bag 50 for receiving and storing the boot assembly in a compact manner. After removal from the vehicle as described above, the boot assembly 28 is bent from its U shape to the enclosed shape of FIG. 2 where the ends of the rod are located adjacent each other. A flap 52 of the bag 50 is then opened to insert the enclosed boot assembly 28 for compact storage. When use of the boot assembly is again required, the flap 52 is opened and the boot assembly 28 is removed from the bag 50 for securement to the vehicle over the folded convertible top in the manner described above.

While the best mode for carrying out the invention has been described in detail, those familiar with the art to which the invention relates will recognize various alternative designs and embodiments for practicing the invention.

What is claimed is:

1. A boot assembly for covering a vehicle convertible top with the convertible top stored in a folded storage position within a U-shaped storage well having an outer extremity defined by the associated vehicle, the boot assembly comprising: a U-shaped boot of flexible material for covering the stored convertible top; said boot having an inner edge that extends around the inboard side of the U-shaped storage well of the vehicle; detachable fasteners for securing the inner edge of the boot to the vehicle around the inboard side of the storage well; said boot also having an outer edge; and said boot assembly also including a U-shaped rod secured to the outer edge of the boot so as to be received within the storage well outboard from the stored convertible top to provide outward loading of the flexible material of the boot against the outer extremity of the storage well such that this outward loading cooperates with the detachable fasteners in securing the boot over the stored convertible top while also permitting the boot assembly to be detached by deflection of the U-shaped rod and to be compactly stored by bending of the U-shaped rod to an enclosed shape.

2. A boot assembly as in claim 1 wherein the U-shaped rod includes ends having latch members, and latch retainers on the vehicle at the forward extremities of the storage well to releasaby secure the latch members on the rod ends to cooperate with the detachable fasteners and the outward loading in securing the boot assembly to the vehicle.

3. A boot assembly as in claim 1 further including a storage bag for receiving and storing the boot assembly after removal from the vehicle and bending thereof to its enclosed shape.

4. A boot assembly for covering a vehicle convertible top with the convertible top stored in a folded storage position within a U-shaped storage well having an outer extremity defined by the associated vehicle, the boot assembly comprising: a U-shaped boot of flexible material for covering the stored convertible top; said boot having an inner edge that extends around the inboard side of the U-shaped storage well of the vehicle; detachable fasteners for securing the inner edge of the boot to the vehicle around the inboard side of the storage well; said boot also having an outer edge; said boot assembly also including a U-shaped rod secured to the outer edge of the boot so as to be received within the storage well outboard from the stored convertible top to provide outward loading of the flexible material of the boot against the outer extremity of the storage well such that this outward loading cooperates with the detachable fasteners in securing the boot over the stored convertible top; said U-shaped rod having ends including associated latch members; latch retainers on the vehicle for securing the latch members on the rod ends to cooperate with the detachable fasteners and the outward loading in securing the boot assembly to the vehicle; and a storage bag for receiving and compactly storing the boot assembly after removal from the vehicle by deflection of the U-shaped rod and bending of the U-shaped rod to an enclosed shape.

5. The invention comprising: a vehicle having a convertible top; said vehicle including a U-shaped storage well in which the convertible top is stored; said storage well having an outer extremity defined by the vehicle; a boot assembly including a U-shaped boot of flexible material for covering the stored convertible top; said boot having an inner edge that extends around the inboard side of the U-shaped storage well of the vehicle; detachable fasteners for securing the inner edge of the boot to the vehicle around the inboard side of the storage well; said boot also having an outer edge; and said boot assembly also including a U-shaped rod secured to the outer edge of the boot and received within the storage well outboard from the stored convertible top to provide outward loading of the flexible material of the boot against the outer extremity of the storage well such that this outward loading cooperates with the detachable fasteners in securing the boot over the stored convertible top while also permitting the boot assembly to be detached by deflection of the U-shaped rod and to be compactly stored by bending of the U-shaped rod to an enclosed shape.

* * * * *

UNITED STATES PATENT AND TRADEMARK OFFICE
CERTIFICATE OF CORRECTION

PATENT NO. : 4,668,006
DATED : May 26, 1987
INVENTOR(S) : John J. Wagner

It is certified that error appears in the above-identified patent and that said Letters Patent is hereby corrected as shown below:

Column 1, line 50, after "permits", "and" should read -- the --;

Column 1, line 67, "store" should read -- stored --.

Column 2, line 56, "utlized" should read -- utilized --.

Column 2, line 64, after "16 of", "that" should read --the--;

Column 4, line 11 claim 2, "releasaby" should read -- releasably --.

Signed and Sealed this

First Day of March, 1988

Attest:

DONALD J. QUIGG

Attesting Officer

Commissioner of Patents and Trademarks